Dec. 20, 1938.  A. S. MITCHELL  2,140,711
METHOD AND APPARATUS FOR MANUFACTURE OF UPHOLSTERY TRIM PANELS
Filed Sept. 7, 1935   7 Sheets-Sheet 6
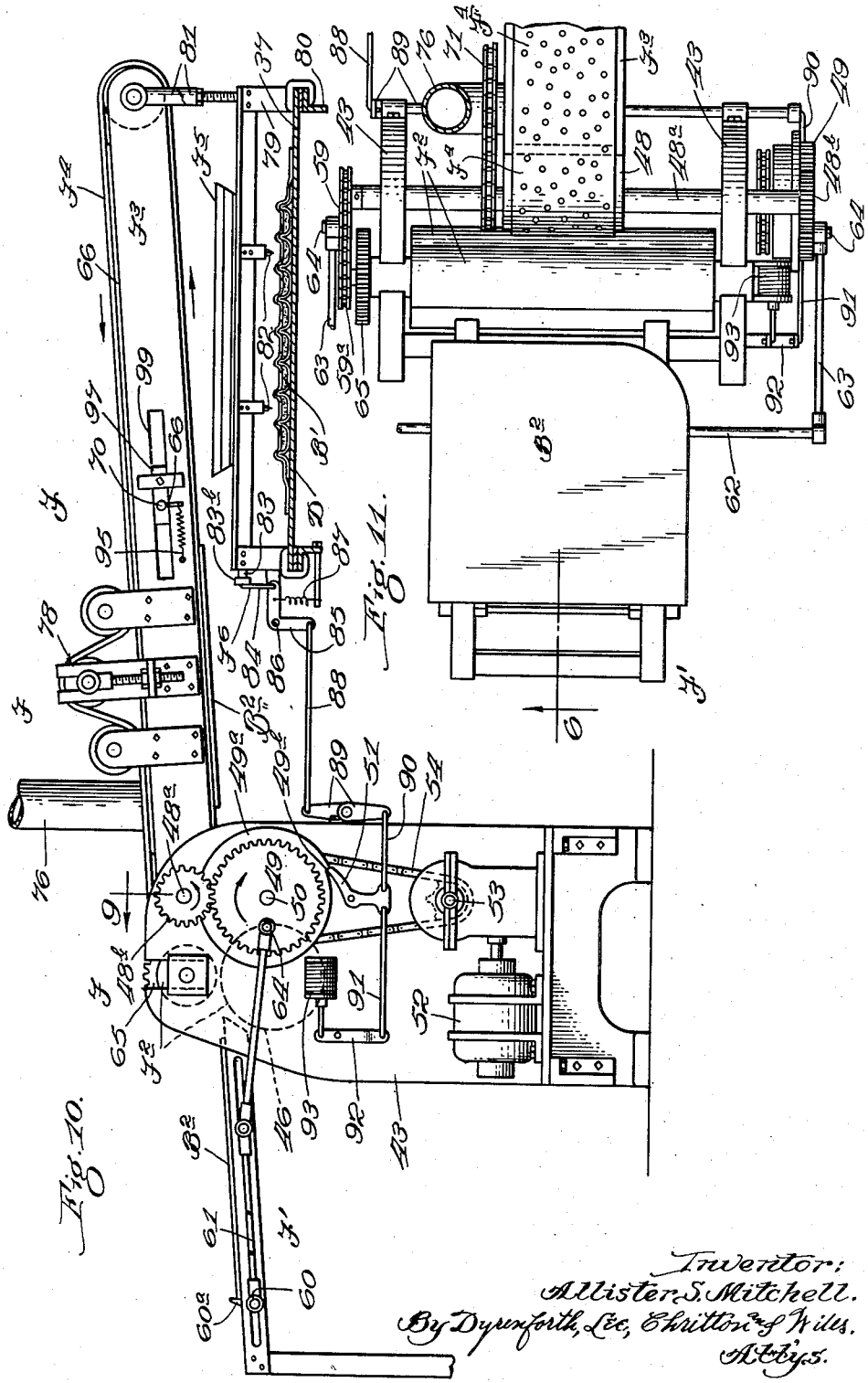

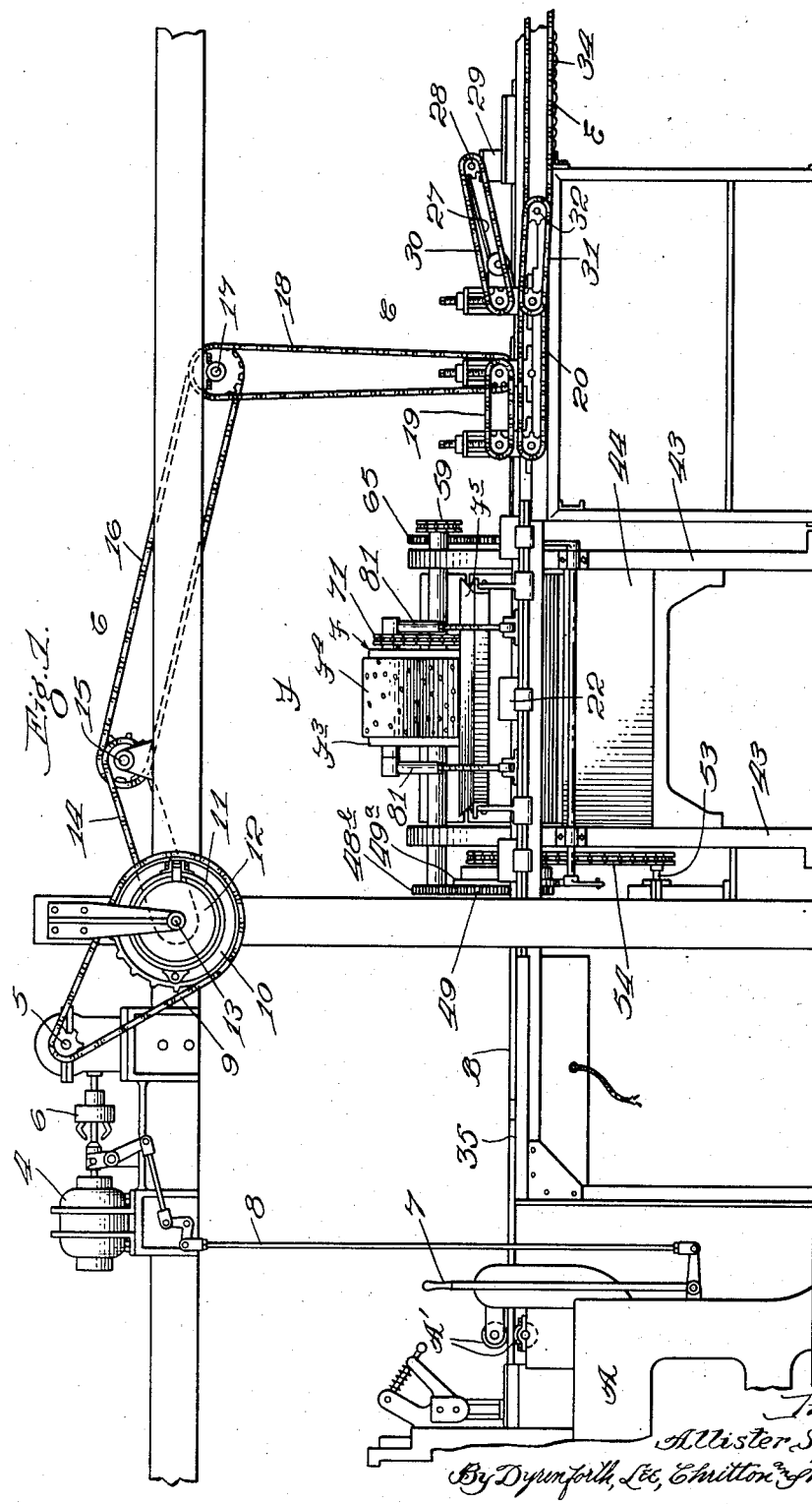

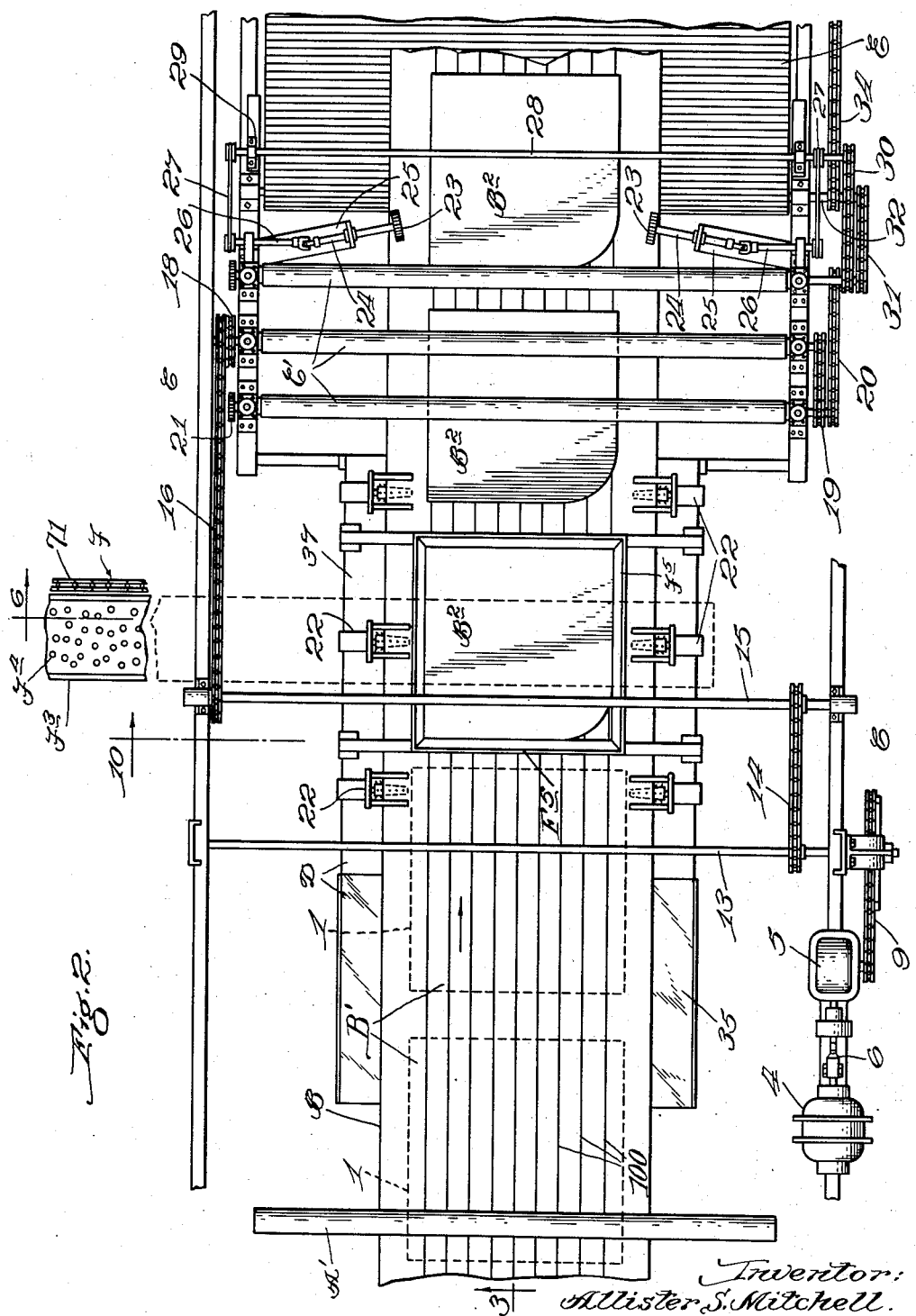

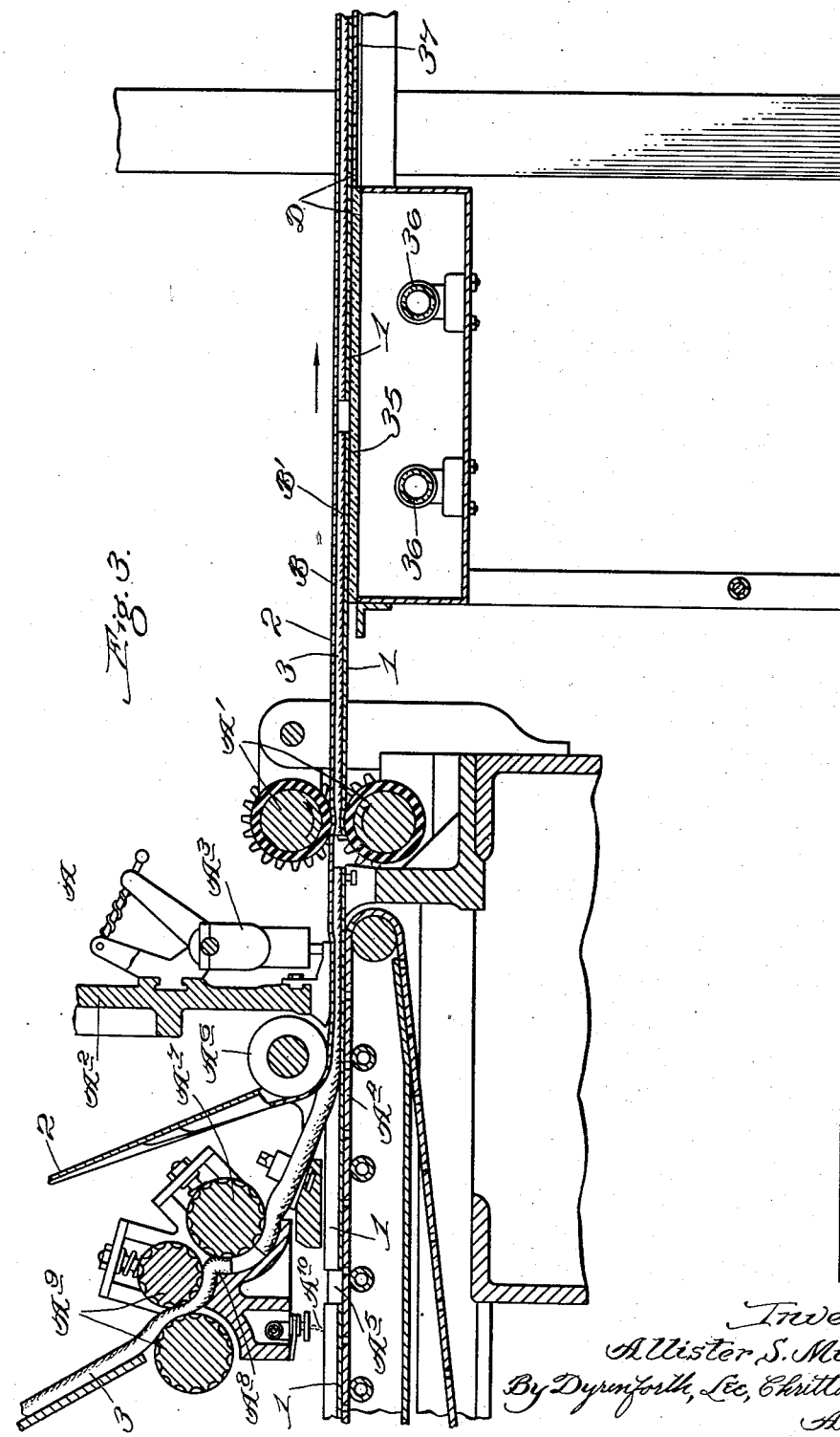

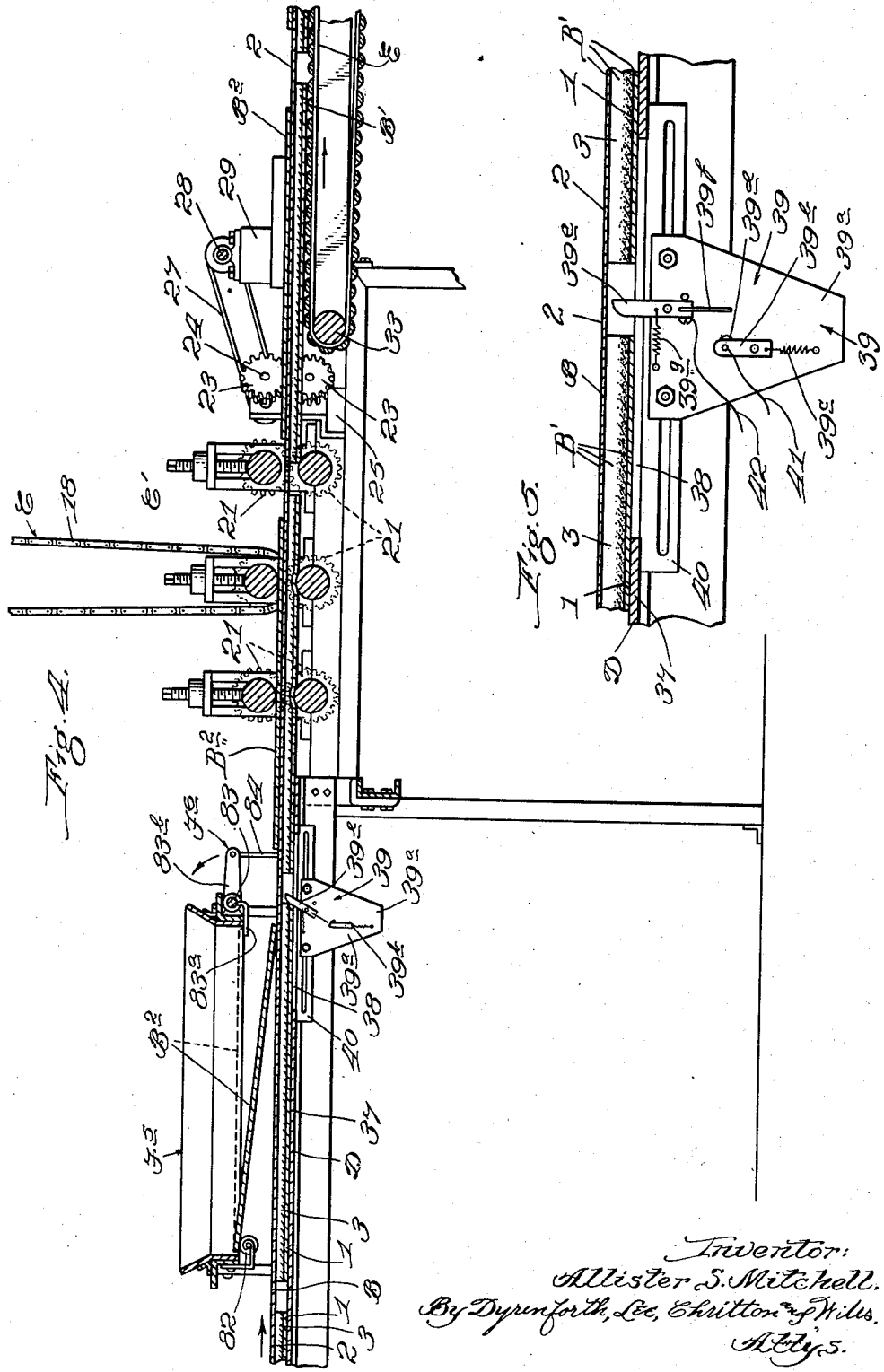

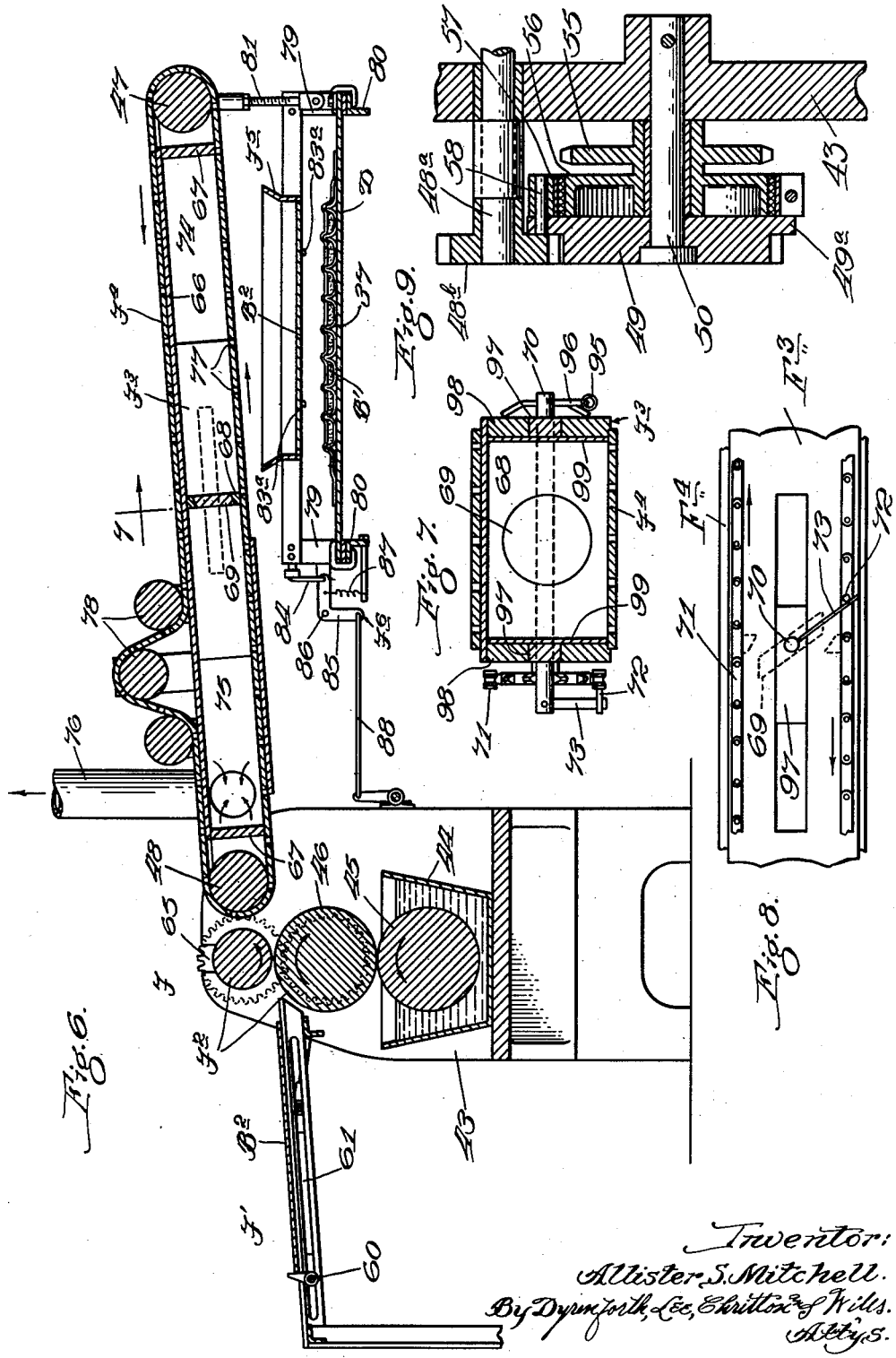

Dec. 20, 1938.   A. S. MITCHELL   2,140,711
METHOD AND APPARATUS FOR MANUFACTURE OF UPHOLSTERY TRIM PANELS
Filed Sept. 7, 1935   7 Sheets-Sheet 7
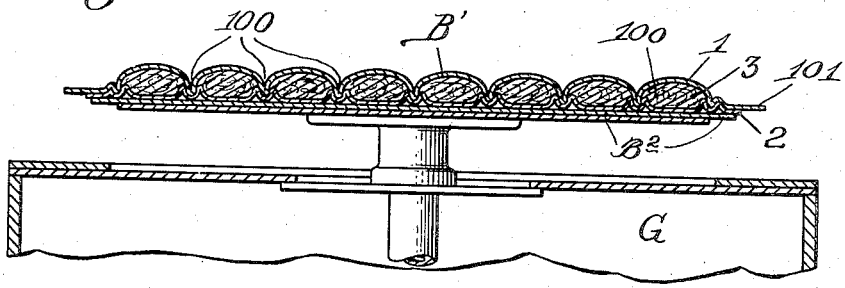
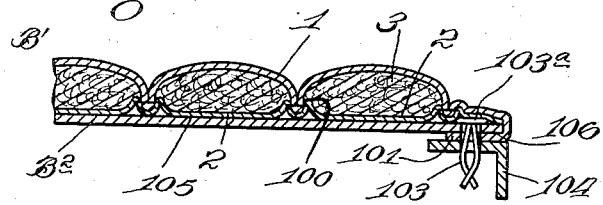 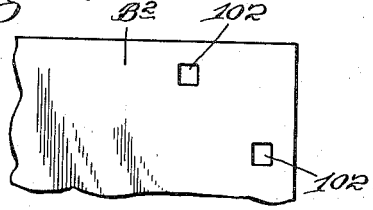
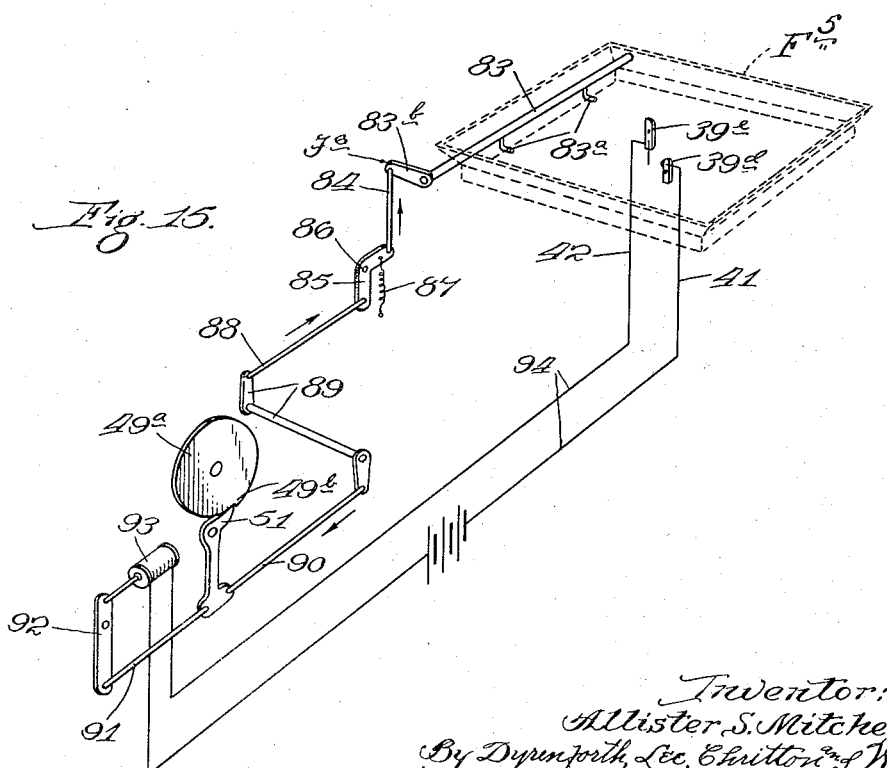

Patented Dec. 20, 1938

2,140,711

UNITED STATES PATENT OFFICE 2,140,711

METHOD AND APPARATUS FOR MANUFACTURE OF UPHOLSTERY TRIM PANELS

Allister S. Mitchell, Detroit, Mich., assignor to National Automotive Fibres, Inc., Detroit, Mich., a corporation of Delaware Application September 7, 1935, Serial No. 39,660

25 Claims. (Cl. 154—2)

This invention relates particularly to the manufacture of improved trim-panels, such as are used for interior trim in automobile bodies.

The primary object is to provide an improved trim-panel and an improved method and apparatus for the manufacture thereof.

It is known to provide, for the purpose of upholstering automobiles, trim-panels equipped with snap-fasteners which can be inserted through holes or sockets in the frame-work of the body of the automobile.

It is desirable that such upholstery-panels shall be provided, between the panel-plate and the finish-fabric which serves as a cover, with padding, giving softness to the upholstery. Also, it is commonly desired to provide the finish-fabric of the panel with lines of stitching, corresponding generally with the lines of stitching, or seams, of the cushions of the automobile; and it is important, in applying the panel-cover to the panel-plate, to employ a method for insuring uniformly straight lines at the lines of stitching, or seams, of the panel-cover. Stated otherwise, it is important to insure against deformation of the lines of stitching, in order that the upholstery on the trim-panel shall have a proper appearance.

Upholstery panels of the character mentioned are of suitable size and contour for the space which they are to occupy; and, where necessary, openings or cut-away portions are provided. For example, upholstery panels for doors may have portions cut away to conform to the contour of the lower portion of the door, and may have openings, as for example for the handle-shaft, the shaft of the window-operating mechanism, or the like. Heretofore, it has been the practice to provide a relatively stiff sheet of material to serve as a foundation-plate, this sheet being cut to suitable contour and provided with necessary openings; and, where a layer of filling material has been interposed between the foundation-plate and the finish-fabric, it has been common practice to employ a sheet of what is known in the trade as "blue wadding", the padding being cut or stamped by dies to give it a contour corresponding with the base-plate and to provide openings corresponding with those in the base-plate. In this method of manufacture, considerable difficulty is encountered in applying the padding to the base-plate and getting it to register properly. Such method of manufacture involves undue expense, and, moreover, fails to give a desirably even surface next to the cover-fabric.

In my application Ser. No. 30,757, filed July 10, 1935, I disclose a trim-panel and method of manufacturing the same possessing important advantages over the prior practice. The present invention provides an improvement over that disclosed in the application just mentioned, and enables an improved trim-panel to be produced more expeditiously and at reduced expense. The improved method described in the present application renders unnecessary a separate step of applying a layer of cotton adhesively to the panel-plate, such as is described in the above-mentioned application; and the improved method herein described enables the panel-cover to be applied to the panel-plate with great facility, while wholly overcoming the danger that the lines of stitching, seams, or pleats, shall be distorted in applying upholstery to the panel-plate.

In the preferred practice of the present invention, pre-cut panel-covers are sewed to a continuous lining-fabric in a multipleater machine, thin cotton batts preferably being introduced into the pleats during the operation of producing a connected series of panel-covers; and the upholstery material then passes, in properly stretched condition, through apparatus for applying and adhesively joining the panel-plates, seriatim, to the lining fabric, the panel-plates being spaced to correspond with the spacing of the panel-covers. The trim-panels are then separated from each other by severing the lining-fabric between the panels.

Subsequently, the margins of the cover-fabric are turned over the edges of the panel-plate and pasted to the back surface of the plate at the margins thereof. This step may be expeditiously performed, if desired, in apparatus of the character shown in my pending application Ser. No. 11,527 filed March 16, 1935. In this apparatus, suction is employed to fold the margins of the cover-fabric about the edges of the panel-plate, and said margins are pasted to the back surface of the panel-plate.

The present invention is illustrated, in a preferred embodiment, in the accompanying drawings, in which—

Fig. 1 is a broken side elevational view of my improved apparatus for manufacturing trim-panels, the left-hand portion of the drawing showing the discharge end of a multipleater machine, with which machine I have combined additional apparatus for adhesively applying panel-plates to the panel-covers while the upholstery is in the form of a web-connected series of panel-covers maintained in properly stretched condition; Fig. 2 a broken plan view of the apparatus shown in Fig. 1; Fig. 3, an enlarged broken vertical longitudinal sectional view showing a portion of the multipleater machine and a portion of the panel-applying apparatus combined therewith; Fig. 4, a broken longitudinal sectional view which may be regarded as forming a continuation of the view shown in Fig. 3; Fig. 5, a broken longitudinal sectional view illustrating the manner in which the panel-covers, in turn, may serve to close an electric circuit to cause an adhesive-coated panel-plate to be dropped onto the back of a panel-cover and also cause a fresh panel-plate to be advanced to the panel-dropping station; Fig. 6, a transverse vertical section taken as indicated at line 6 of Fig. 2, illustrating the mechanism employed for feeding panel-plates, coating them with an adhesive, dropping them into a hopper, and ultimately dropping them upon the back of the upholstery in registration with the panel-covers; Fig. 7, a section taken as indicated at line 7 of Fig. 6, showing a detail of the pneumatic conveyor employed for carrying the coated plates to and dropping them into the hopper, the suction-box of said conveyor being divided into two compartments separated by a damper which is automatically closed to cut off the suction in the compartment over the hopper, thus allowing the plate to drop; Fig. 8, a broken elevational view of the suction-conveyor, viewed from the far side and illustrating the damper-closing means, the damper being maintained normally open by a spring shown in Fig. 10; Fig. 9, a broken transverse sectional view taken as indicated at line 9 of Fig. 10, showing a detail of the means whereby intermittent actuation of the panel-feeding mechanism is effected; Fig. 10, a broken transverse sectional view taken approximately as indicated at line 10 of Fig. 2, showing the panel coating and feeding mechanism in elevation; Fig. 11, a broken plan view of the mechanism appearing at the left-hand portion of Fig. 10; Fig. 12, a broken sectional view illustrating the manner in which the marginal portions of the cover-fabric may be formed about the edges of the panel-plate (after the trim-panels have been separated by severing the lining between panels); Fig. 13, a broken sectional view illustrating the manner in which a trim-panel is connected by a snap-fastener with a frame-member of an automobile body; Fig. 14, a broken plan view of a panel-plate; and Fig. 15, a diagrammatic view illustrating the electric control of the panel-feeding and dropping mechanism.

The machine for forming the pleated and preferably stuffed upholstery may be any suitable multipleater machine. Preferably, it is a machine of the character described in my Patent No. 1,996,728, granted April 2, 1935, in which a continuous lining fabric, a series of pre-cut cover-fabrics, and cotton batts are fed through the machine and the cover-fabrics are sewed to the lining fabric at lines between the cotton batts. In the machine described in the above-mentioned patent, provision is made for automatically severing and spacing the batts, so that the batt-sections are spaced with relation to each other, leaving spaces between cushions. Preferably that feature is retained in the present apparatus.

In the construction illustrated, A designates an upholstery-making machine provided with feed-rolls A' at the delivery end of the machine which serve to draw the upholstery through the forming and sewing mechanisms of the machine; B, upholstery emerging from the machine A and traveling in the direction indicated by the arrow; C, upholstery-feeding mechanism located in advance of the feed-rolls A', said mechanism comprising a group of feed-rolls C' which serve also as compression rolls and serve to firmly apply the adhesive-coated panel-plates to the panel-covers as they advance from the point where they are dropped, in succession, upon the upholstery; D, a platform, or bed, intervening between the feed-rolls A' and the group of feed and pressure rolls C''; E, a conveyor located in advance of the group of rolls C'; and F, transverse plate-feeding, coating, and dropping mechanism, comprising a feed-table F', coacting feeding and coating rolls $F^2$, a suction-box $F^3$, a pneumatic conveyor $F^4$, and a hopper $F^5$ equipped with panel-dropping mechanism $F^6$.

In the apparatus illustrated, use is made of the principle of causing each panel-cover, as it comes into position beneath the hopper $F^5$, to close an electric circuit and permit a panel-plate to drop onto the upholstery, the panel coating and feeding mechanism being at the same time thrown into operation and continuing in operation until a fresh panel has dropped into the hopper. That is, the panel-feeding mechanism operates periodically to advance a coated panel-plate and drop it into the hopper, where it is in readiness to be dropped upon the upholstery when the next panel-cover arrives in proper position beneath the hopper.

The upholstery-making machine A need not be described in detail, inasmuch as it is fully described in said patent. Referring to Figs. 1 and 3, the feed-rolls A' are positively actuated to feed the materials through the machine A.

Making reference to certain parts of the machine A which are illustrated, $A^2$ designates a cross-head upon which are mounted sewing-mechanisms $A^3$; $A^4$, a pneumatic conveyor which forms a portion of the bed of the machine; $A^5$, suitably spaced longitudinal ribs disposed above the conveyor $A^4$ and adapted to cooperate with other known mechanism to form seam-ridges and intervening pleat-fullnesses in pre-cut covers designated 1; $A^6$, forming mechanism for forming seam-ridges in a lining fabric 2, in which the seam-ridges of the pre-cut covers become nested; $A^7$, a batt-feeding roll located in a concave having a breaker-edge designated $A^8$; $A^9$, rolls constituting a portion of the batt-feeding mechanism, it being noted that the batt-feeding mechanism, including the roll $A^9$, is periodically stopped, while the roll $A^7$ continues in operation, so that the batts, designated 3, will be severed at the point $A^8$. The fabrics, with the batt-sections properly entered in the pleats, are fed beneath the cross-head $A^2$, and the nested U-form seam-ridges are properly sewed together in a manner fully set forth in the above-mentioned patent. A chain-like brush $A^{10}$ intermittently contacts with the ribs $A^5$ to close an electric circuit which controls the batt-breaking means.

The sewed upholstery B emerging from the machine A thus comprises the lining-fabric 2, the pre-cut covers 1, and the intervening batts 3 located in the pleats. In some cases, it may be desired to omit the batts. In such cases, the necessity for providing pleat-fullnesses in the pre-cut covers no longer exists, and this feature may be omitted.

The mechanism C preferably is so actuated as to make the group of rolls C' tend to feed the materials somewhat faster than they are fed by the rolls A', so that suitable tension will be maintained upon the the upholstery while the panel-plates are being applied and secured to the upholstery.

Referring to Figs. 1, 2 and 4, the mechanism C comprises a motor 4 which is adapted to operate a shaft 5 through the medium of a clutch 6 and suitable gears, the operation of the clutch 6 being controlled by a hand-lever 7 and connections 8. From the shaft 5 a sprocket chain 9 serves to actuate a sprocket wheel 10 which is equipped with a friction-drive 11 for a wheel 12 which is fixed on a shaft 13. The shaft 13 is connected by a sprocket chain 14 with the shaft 15 which actuates a sprocket chain 16, driving the shaft 17 which is connected by a sprocket chain 18 with one of the rolls in the group of feed-rolls C. The rolls in this group are positively geared together by sprocket-chains 19 and 20 and by gears 21.

The upholstery is stretched transversely, in the space between the feed-rolls A' and the group of feed and compression rolls C', by means of stretching devices 22 which are well known in the art, and further by means of toothed wheels 23 which are located in advance of the group of rolls C'. The wheels 23 are secured on shafts 24 journaled in brackets 25 and connected by universal joints with shafts 26 which are driven by belts 27 from a transverse shaft 28 supported in brackets 29. The shaft 28 is driven by a sprocket chain 30 from one of the rear rolls in the group C'. A sprocket-chain 31, driven from one of said rear rolls, serves to actuate a shaft 32 which actuates the roll 33 of the conveyor E. A sprocket chain 34 extends forwardly from the shaft 32 and serves to operate the roll (not shown) at the advance end of the conveyor E.

It will be noted that the toothed wheels 23 are disposed in oblique planes, and as they rotate counter-clockwise, they tend to stretch the upholstery transversely and at the same time tend to assist the group of rolls C' in feeding the upholstery.

The platform or bed D over which the upholstery passes is provided with a glass section 35 beneath which are located illuminating tubes 36. The purpose is to enable the upholstery to be inspected as it passes to the station where the panel-plates are applied. Preferably, the panel-plates are strong cardboard, or comparatively thin fibre board. They may be of metal or other material if desired. In advance of the glass plate 35 is a plate 37 which may be of wood or sheet metal. As shown in Fig. 4, this member is cut away or slotted at 38 to accommodate a circuit-making and breaking device 39. This device is shown (Figs. 4 and 5) as consisting of a bracket-plate 39ª which is forwardly and rearwardly adjustable, by means of bolt and slot connections, with a fixed bracket 40 carried by the stand or platform; a member 39ᵇ pivotally supported on the member 39ª and normally held in vertical position by a spring 39ᶜ, the member 39ᵇ carrying an insulated contact point 39ᵈ, and a trigger-like member 39ᵉ pivotally supported on the member 39 and equipped at its lower end with a contact member 39ᶠ. Conductors 41 and 42 are connected, respectively, with the contact members 39ᵈ and 39ᶠ. The member 39ᵉ normally remains in the upright position shown in Fig. 5, the lower end of the member being sufficiently heavy to serve as a weight for righting the member; or, in lieu thereof, a spring 39ᵍ may be employed to return the member 39ᵉ to its normal upright position.

For convenience, the panel-covers are designated B' and the panel-plates are designated B².

The conveyor E at the advance end of the machine may be of any suitable construction. A simple leather or rubber belt mounted on suitably driven rollers will serve the purpose. If desired, the trim-panels may be severed from each other by means of an electric cutter actuated by an operative located adjacent the conveyor E. Such a cutter may be operated readily while the conveyor is advancing the connected trim-panels.

Referring to Fig. 2 and Figs. 4-11, the transverse plate-feeding mechanism F is shown as comprising, in addition to the parts F—F⁶ heretofore mentioned, a frame or housing 43 in which is located an adhesive-tank 44 in which is journaled a roller 45 which contacts with and supplies adhesive to the lower roll 46 of the pair of rolls F². The pneumatic conveyor F⁴ is mounted on rolls 47 and 48, the latter having a shaft 48ª equipped with a gear 48ᵇ (Figs. 9 and 10). The gear 48ᵇ is periodically driven through the medium of a gear 49 which is journaled on a fixed shaft 50 (Figs. 9 and 10). The gear 49 has an integral flange 49ª which is provided with a notch or tooth 49ᵇ which is engaged by a pawl 51 which normally holds the gear 49 against rotation. The gear 49 is driven intermittently by a motor 52 which, through gears (not shown) actuates a shaft 53 which is connected by a sprocket chain 54 with a sprocket wheel 55 journalled on the fixed shaft 50. A friction wheel 56, fixed to rotate with wheel 55, is also journalled on the shaft 50 and is frictionally engaged by a surrounding friction-ring 57 equipped with a stud 58 which serves to actuate the gear 49 when permitted by withdrawal of the pawl 51.

One end of the shaft 48ª is connected by a sprocket chain 59 with the shaft of the upper one of the rolls F², so that the rolls F² and the conveyor belt are geared to move at the same rate of speed.

The feed table F' is equipped with a slide 60 moving in slots 61 with which the frame of the feed-table is provided. The slide is actuated by a reciprocating shaft 62 whose ends are joined by connecting rods 63 to crank pins 64, carried, respectively, by the gear 49 and by a sprocket-wheel 59ª driven by the chain 59. The rolls F² are connected by gears 65.

The suction-box F³ comprises a suitable inverted box-like frame having a top wall 66, end-walls 67, and a dividing wall 68 in which is mounted a damper 69 carried by a shaft 70. The shafts of the rolls 47 and 48 are connected by a sprocket chain 71 (Figs. 8 and 11). This chain carries a stud or studs 72 which are adapted to strike an arm 73 or one end of the damper-shaft 70 to momentarily close the damper 69 when it is desired to shut off the suction from the compartment 74 of the suction-box to permit a panel to drop into the hopper F⁵. The initial compartment 75 of the suction-box is connected with a suction-pipe 76 which may be exhausted by any suitable means.

The pneumatic belt F³ is provided with perforations 77. The belt is shown as passing about a tension device 78.

The hopper F⁵ is carried by bracket members 79 which are adjustably mounted on longitudinal frame-members 80 which carry the platform-member 37. The frame of the pneumatic conveyor preferably is journaled coaxially with the roller 48, and its free end may be adjusted up or down by adjusting devices 81.

The hopper F⁶ is shown as being suitably formed to properly locate and confine a panel-plate B² in its lower portion. As appears from Figs. 4 and 6, the frame of the hopper is equipped at its rear side with small plate-supporting rollers 82, and at its front side with a rock-shaft 83 which carries short arms 83ᵃ which serve as releasable retainers for the front edge of the panel-plate. The rock-shaft 83 is equipped with a trip-arm 83ᵇ which is adapted to be lifted by a connecting rod 84, thus permitting the catches 83ᵃ to be withdrawn to allow the panel-plate to drop onto the upholstery. The link 84 is adapted to be lifted by a bell crank lever 85 supported on a pivot 86. A spring 87 serves to return the rock-shaft 83 to its normal position in which the pins or arms 83ᵃ are ready to receive and support a panel-plate. One arm of the bell-crank 85 is joined by a connecting rod 88 to a lever 89 which is connected by a link 90 with the shank of the pivoted pawl 51. This shank is also connected, by a connecting rod 91, with a lever 92 which is adapted to be actuated by a solenoid 93 when the circuit illustrated in Fig. 15 is completed.

The operation of the machine may be briefly stated.

A web-connected series of panel-covers is formed in the multipleater machine A in the manner described in my above-mentioned patent, the pre-cut cover-fabrics being sewed to the lining fabric along longitudinal lines and the pleats being filled with batts as the pleats are being formed. It will be understood that ordinarily only a few shallow pleats will be formed and stuffed in the upholstery-making machine, although the drawings illustrate the use of numerous pleats in the upholstery. As is well known, the placing of cover-fabrics on the lining-fabric may vary, so that the spacing between panel-covers may vary. In fact, the feeding of cover-fabrics to the machine may be interrupted for some reason, so that a relatively large space may intervene. Nevertheless, each panel-cover, when it nears the position beneath the hopper where the panel-plate is to be dropped onto the upholstery, serves to actuate the trigger-like contact member 39ᵉ and close the electric circuit which, in Fig. 15, is designated generally as 94. It will be understood that when the member 39ᵉ is swung to the position shown in Fig. 4, the member 39ᶠ temporarily contacts the member 39ᵈ, thus closing the circuit. Thereafter, the circuit is promptly broken and held broken while the member 39ᵉ is held in the position shown in Fig. 4 during the passage of the panel-cover. After the cover passes, the member 39ᵉ swings back to the normal position shown in Fig. 5 and is in readiness to be actuated by the next panel-cover when it approaches the loading position.

When the circuit 94 is momentarily closed, the magnet 93 is energized and operates to release the pawl 51 and permit the plate-conveyor to operate; also, the retainer fingers 83ᵃ are temporarily withdrawn, thus permitting a panel-plate to drop from the hopper onto the panel-cover located beneath the hopper. When the conveyor belt is operated, the slide 60 of the feed-table is at the same time actuated. This slide is equipped with shoulders 60ᵃ which serve to engage the rear edge of a panel-plate B² placed upon the feed-table by an attendant. In the operation of the conveyor, the slide 60 advances the freshly introduced panel-plate between the rolls F², and the lower one of said rolls, designated 46, serves to apply adhesive to the lower surface of the panel-plate. Before the panel-plate passes from the control of the rolls F², it is gripped by the pneumatic conveyor F⁴.

The conveyor moves a definite distance at each actuation. That is, the gear 49 makes one complete revolution, and then is prevented from further movement by the pawl 51, notwithstanding the fact that the motor 52 continues to actuate the shaft 50 (Fig. 9). The arrangement is such that a coated panel-plate is supported below the compartment 75 of the suction-box; and in the next movement of the conveyor this panel-plate is carried to a position beneath the compartment 74 of the suction-box. Thereupon, the damper 69 is temporarily closed by the mechanism shown in Fig. 7. A spring 95 (Figs. 7 and 10) acting through an arm 96, carried by the shaft 70, serves normally to hold the damper 69 in open position. At proper intervals, the damper is closed to drop the plate from the conveyor belt into the hopper, the catches 83ᵃ having in the meantime returned to the normal retaining position shown in Fig. 4.

The dividing wall 68 between the compartments 74 and 75 is adjustable longitudinally of the conveyor, being mounted, for this purpose, in slidable blocks 97 connected with the side walls 98 of the suction-box. To cover the slots in which the blocks 97 are movable, internal plates 99 are mounted on the shaft 70.

The feed of the upholstery through the apparatus preferably, but not necessarily, is continuous. When the panel-plate drops upon the upholstery, the adhesive on the lower surface of the panel-plate adheres to the upholstery, and the panel-plate then moves forwardly with the upholstery and passes between the pressure-rolls of the battery of rolls C'. This causes the panel-plate and the upholstery to be firmly pressed together and the panel-plate becomes firmly cemented to the lining-fabric of the upholstery. The connected series of panels may be severed from each other in any desired manner. If desired, this can be done by means of an electrical cutter actuated by an operative stationed at one side of the conveyor E.

The lining-fabric may be suitably trimmed at the margins of the panel; and, if desired, the panel-cover may be suitably notched at the ends of the seams, which in Figs. 12 and 13 are designated 100. The cover-fabric preferably has suitable projecting margins 101 which can be turned under the margins of the panel-plate B² are cemented thereto. This operation may be performed by means of suitable pneumatic apparatus, a portion of which designated G, is illustrated in Fig. 12. For a fuller understanding of this operation, reference is made to my application No. 11,527 filed March 16, 1935. The panel-plates B² ordinarily are provided near their edges with perforations 102 which are adapted to receive snap-fasteners 103. After the margins 101 of the cover-fabric have been pasted to the back surface of the plate B², perforations may be punched to register with the perforations 102 of the panel-plate. Thereafter, the snap-fasteners 103 may be introduced by means of a suitable instrument, the head 103ᵃ of the fastener being then disposed between the panel-plate and the overlying lining-fabric. The panel-plate ordinarily is secured to a frame-member 104 of the automobile body by passing the spring-prongs of the fastener through a perforation in the frame-member.

It will be understood that a coating of cementitious material is interposed between the lining-fabric and the panel-plate B² along the surface indicated at 105 in Fig. 13; also that a coating of adhesive is interposed between the lower margin of the panel-plate and the inturned margin of the cover fabric as indicated at 106 in Fig. 13.

Broadly, the method herein described involves the principle of feeding a web-connected series of panel-covers, holding the covers stretched both longitudinally and transversely, and applying panel-plates to the panel-covers, or vice versa, while the panel-covers are in stretched condition. Preferably this is accomplished while the upholstery is being fed continuously; and preferably the panel-plates are delivered in coated condition to the back surfaces of the panel-covers. It would be possible, of course, to spray the backs of the panel-covers with an adhesive in lieu of applying adhesive to the panel-plates. A decided economy arises by employing apparatus in which a sewing machine serves as a portion of the apparatus for joining the cover-fabric to the lining. Broadly, however, the main purpose of the invention can be accomplished by feeding a connected series of panel-covers and holding the panel-covers in stretched condition by any suitable mechanism while the panel-plates are being applied, after which the panels are separated from each other and the edges bound, preferably by turning the margins of the cover-fabrics about the edges of the panel-plates and cementing them to the panel-plates.

Referring to Fig. 6, it may be stated that the dividing wall 68 is made adjustable so that the final compartment 74 of the suction conveyor may be made to correspond approximately with the hopper F⁵, it being noted that hoppers of different areas may be employed where panel-plates of different areas are required. Moreover, the supports for the hopper F⁵ may be adjusted on the guides 80 to properly space the members which support the hopper and properly center the hopper with relation to the conveyor. Referring to Fig. 4, the bracket 39 can be adjusted longitudinally of the bed of the apparatus to insure the dropping of the panel-plates in accurate registration with the panel-covers as the upholstery passes beneath the hopper F⁵. The length of the rolls F² shown in Figs. 5 and 11 is sufficient to accommodate the widest panel-plate. As will be noted from Fig. 11, the width of the suction-conveyor F³ need not be as great as the width of the panel-plates B². The feed-table F' is of sufficient width and length to accommodate the largest sizes of panel-plates.

The foregoing detailed description has been given for clearness of understanding only, and no unnecessary limitations should be understood therefrom, but the appended claims should be construed as broadly as permissible, in view of the prior art.

What I claim as new and desire to secure by Letters Patent is:

1. In a panel-upholstering process, the steps which comprise: feeding a web-connected series of spaced, pre-cut panel-covers and holding the panel-covers in stretched condition; supporting panel-plates at a panel-applying station above the path of the upholstery; and automatically releasing the panel-plates in succession upon the upholstery in timed relation to the movement of the panel-covers.

2. In a panel-upholstering process, the steps which comprise: feeding a web-connected series of pre-cut, spaced panel-covers in stretched condition; supporting panel-plates releasably above the path of the upholstery; and electrically controlling the placing of the panel-plates upon the upholstery in registration with the panel-covers by movement of the panel-covers, seriatim.

3. In a panel-upholstering process, the steps which comprise: feeding a web-connected series of pre-cut, spaced panel-covers in stretched condition; and feeding panel-plates seriatim to a position adjacent the path of the upholstery and automatically placing them in turn upon the upholstery in registration with the pre-cut covers by movement of the pre-cut covers, in turn.

4. Apparatus for the purpose set forth, comprising: mechanism for advancing web-connected panel-covers and holding them in laterally and longitudinally stretched condition; and coacting means for placing adhesive-coated panel-plates against the backs of said panel-covers while the panel-covers are in stretched condition.

5. Apparatus for the purpose set forth, comprising: mechanism for advancing web-connected panel-covers and stretching them longitudinally and transversely and mechanism for placing and securing panel-plates on the backs of the web-connected panel-covers while in stretched condition.

6. Apparatus for the purpose set forth, comprising: mechanism for feeding and holding in stretched condition a web-connected series of pre-cut panel-covers, said mechanism comprising feeding and compression rolls located in an advanced position and means for gripping the upholstery, spaced at a distance in the rear thereof; and means intervening between said feeding and compression rolls and said gripping means for placing cover-plates and adhesive upon the backs of the pre-cut covers, in turn.

7. Apparatus as set forth in claim 6, in which said feeding and compression rolls are equipped with means for operating them continuously.

8. In apparatus for the purpose set forth: mechanism for feeding in stretched condition a web-connected series of pre-cut, spaced panel-covers; and mechanism controlled by the panel-covers in turn for placing panel-plates upon the upholstery in registration with the panel-covers.

9. In apparatus for the purpose set forth: mechanism for feeding a web-connected series of pre-cut panel-covers while stretching them longitudinally and transversely; panel-holding and dropping means disposed over the path of the upholstery; and automatically actuated means for causing the panel-plates to be dropped by gravity upon the panel-covers in turn.

10. Apparatus as set forth in claim 9, in which said automatic means includes an electric device having a circuit equipped with circuit-controlling means actuated by the pre-cut panel-covers, in turn.

11. In apparatus of the character set forth: mechanism for feeding a web-connected series of pre-cut panel-covers and holding them in stretched condition; a hopper disposed above the path of the upholstery and equipped with panel-dropping mechanism; actuating means for said last-named mechanism; and means for feeding panel-plates to and dropping them in said hopper.

12. In apparatus for the purpose set forth: mechanism for feeding a web-connected series of pre-cut spaced panel-covers in stretched condition; and panel-plate feeding and placing mechanism comprising means for applying an adhesive coating to panel-plates in succession and placing the coated plates in succession upon the upholstery in registration with the panel-covers.

13. Apparatus as set forth in claim 12, in which said second-mentioned mechanism comprises panel-plate coating means, means for conveying the coated panels, and means for receiving the coated panels from the conveyor, equipped with periodically actuated means for dropping the coated panel-plates upon the upholstery in registration with the panel-covers.

14. In apparatus of the character set forth: mechanism for feeding a web-connected series of pre-cut panel-covers and holding the panel-covers in stretched condition; and coacting mechanism comprising a pneumatic carrier for conveying panel-plates to a position above the path of the upholstery and dropping the panel-plates in succession, and means for feeding the panel-plates to said carrier and coating those surfaces of the panel-plates which are opposite the surfaces gripped by said carrier.

15. In apparatus of the character set forth: mechanism for feeding a web-connected series of pre-cut spaced panel-covers and holding the panel-covers in stretched condition; and coacting mechanism controlled by the panel-covers, in turn, comprising a panel-holding and dropping device disposed above the path of the upholstery, a pneumatic conveyor for conveying the panel-plates to the hopper, said conveyor equipped with means for controlling the suction to permit the panel-plates to drop into the hopper, and means for feeding panel-plates to the conveyor and applying adhesive coating to the surfaces of the panel-plates which are to contact with the upholstery.

16. In apparatus of the character set forth: mechanism for feeding a web-connected series of pre-cut spaced panel-covers and holding the panel-covers in stretched condition; and coacting mechanism controlled by the panel-covers, in turn, comprising a panel-folding and dropping device disposed above the path of the upholstery, a pneumatic conveyor for conveying the panel-plates to the hopper, said conveyor equipped with means for controlling the suction to permit the panel-plates to drop into the hopper, and means for feeding panel-plates to the conveyor and applying adhesive coating to the surfaces of the panel-plates which are to contact with the upholstery, said last-named mechanism including a friction-drive for said conveyor, controlled by the panel-covers, in turn.

17. In apparatus of the character set forth, mechanism for feeding and holding in stretched condition a web-connected series of pre-cut panel-covers; and coacting mechanism comprising panel-plate holding and dropping means, panel-plate conveying means, and panel-plate feeding and coating means cooperating with said conveying means, this mechanism including also a continuously operating friction-member and a coacting friction-member for actuating the several means enumerated, said last-mentioned friction-member being normally held in restraint, the restraining means being under control of the pre-cut covers, in turn.

18. In apparatus of the character set forth: mechanism for feeding a web-connected series of pre-cut panel-covers and stretching the panel-covers; and coacting mechanism comprising a reciprocating panel-plate feeding slide, coacting rolls for receiving panel-plates therefrom and applying adhesive coating to the panel-plates, a pneumatic conveyor for advancing the panel-plates to position above the path of the upholstery, and dropping the panel-plates in succession; and means for causing periodic actuation of said second-mentioned mechanism.

19. Apparatus as set forth in claim 18, in which said last-mentioned means includes an electric circuit having a circuit-controlling device actuated by the pre-cut covers, in turn.

20. Apparatus as set forth in claim 18, in which the pneumatic conveyor is provided with a suction box having two compartments and is equipped with means for cutting off suction to the compartment disposed over the path of the upholstery.

21. Apparatus as set forth in claim 18, in which the pneumatic conveyor extends transversely of the path of the upholstery and has a compartment above the path of the upholstery equipped with means for cutting off the suction and permitting the panel-plates to drop.

22. Apparatus as set forth in claim 18, in which the pneumatic conveyor has a compartment provided with an adjustable wall for varying the length of said compartment, said compartment being equipped with means for cutting off suction to permit the panel-plates to drop.

23. In apparatus of the character set forth: mechanism for feeding a web-connected series of pre-cut spaced panel-covers and holding the panel-covers in stretched condition, said mechanism including feeding and compressing rolls located in an advanced position; panel-plate holding and dropping mechanism disposed above the path of the upholstery; and mechanism for coating panel-plates and delivering them to said second-mentioned mechanism.

24. In apparatus of the character set forth, a panel-plate receiving hopper equipped with dropping mechanism; and a suction-conveyor having a compartment of adjustable length disposed over said hopper, said conveyor being equipped with means for periodically cutting off suction to said compartment.

25. Apparatus as set forth in claim 24, in which the adjustable length of said compartment is attained by an adjustable wall at an intermediate portion of the suction-box which divides the suction-box into an initial compartment and the adjustable length compartment mentioned, said adjustable wall being equipped with a periodically closed, normally open damper, the suction conveyor having suction means connected with the initial compartment of the conveyor.

ALLISTER S. MITCHELL.